United States Patent
Bats et al.

(10) Patent No.: US 8,890,351 B2
(45) Date of Patent: Nov. 18, 2014

(54) INSTALLATION FOR PRODUCING ELECTRICITY INCLUDING A PLURALITY OF ELECTRICITY PRODUCING DEVICES CAPABLE OF TRANSFORMING MECHANICAL ENERGY INTO ELECTRIC ENERGY

(71) Applicant: ALSTOM Hydro France, Levallois Perret (FR)

(72) Inventors: Guillaume Bats, Nantes Cedex (FR); Philippe Rouault, Nantes-Cédex (FR)

(73) Assignee: Alstom Renewable Technologies, Grenoble (FR)

( * ) Notice: Subject to any disclaimer, the term of this patent is extended or adjusted under 35 U.S.C. 154(b) by 114 days.

(21) Appl. No.: 13/727,311

(22) Filed: Dec. 26, 2012

(65) Prior Publication Data

US 2013/0169055 A1    Jul. 4, 2013

(30) Foreign Application Priority Data

Dec. 28, 2011 (FR) .................................. 11 62495

(51) Int. Cl.
| | |
|---|---|
| F01D 15/10 | (2006.01) |
| F02C 6/00 | (2006.01) |
| H02K 7/18 | (2006.01) |
| H02P 9/04 | (2006.01) |
| H02J 3/38 | (2006.01) |

(52) U.S. Cl.
CPC .. *H02J 3/38* (2013.01); *H02J 3/381* (2013.01)
USPC ......................................................... 290/52

(58) Field of Classification Search
CPC .................................. H02J 3/38; H02J 3/381
USPC ........................................ 290/52; 307/84, 82
See application file for complete search history.

(56) References Cited

U.S. PATENT DOCUMENTS 7,928,592 B2 *  4/2011  Wagoner et al. ............... 290/44

2011/0198847 A1 *  8/2011  Hopewell ........................ 290/44

FOREIGN PATENT DOCUMENTS

| | | |
|---|---|---|
| DE | 10 2008 048 258 A1 | 4/2010 |
| EP | 2 141 795 A1 | 1/2010 |
| FR | 1.155.559 A | 5/1958 |
| WO | WO 2010/049027 A1 | 5/2010 |

OTHER PUBLICATIONS

G. Brauner, "Netzanbindung von Windkraftanlagen," 116. Jg (1999). H. 7/8 Volume: 8038: 428-432.

* cited by examiner

*Primary Examiner* — Javaid Nasri

(74) *Attorney, Agent, or Firm* — Buchanan Ingersoll & Rooney PC

(57) ABSTRACT

An exemplary electricity producing installation includes electricity producing devices at least partly immersed in water, each electricity producing device having a rotary mechanical receiver and an alternator. The alternator includes at least one rotor and at least one stator. The at least one rotor of the alternator can be set into rotation by a rotary mechanical receiver. Each electricity producing device produces an electric AC signal with variable voltage and frequency conveyed by an at least partly immersed electric transport cable. The installation further includes an interconnection device having parallel electric transport cables connected to an input and which provide at the output a joint electric signal with variable frequency and voltage, the current amplitude of which is equal to the sum of the input currents. A partly immersed export cable connects the output of the interconnection device to a power conversion device out of the water.

9 Claims, 1 Drawing Sheet

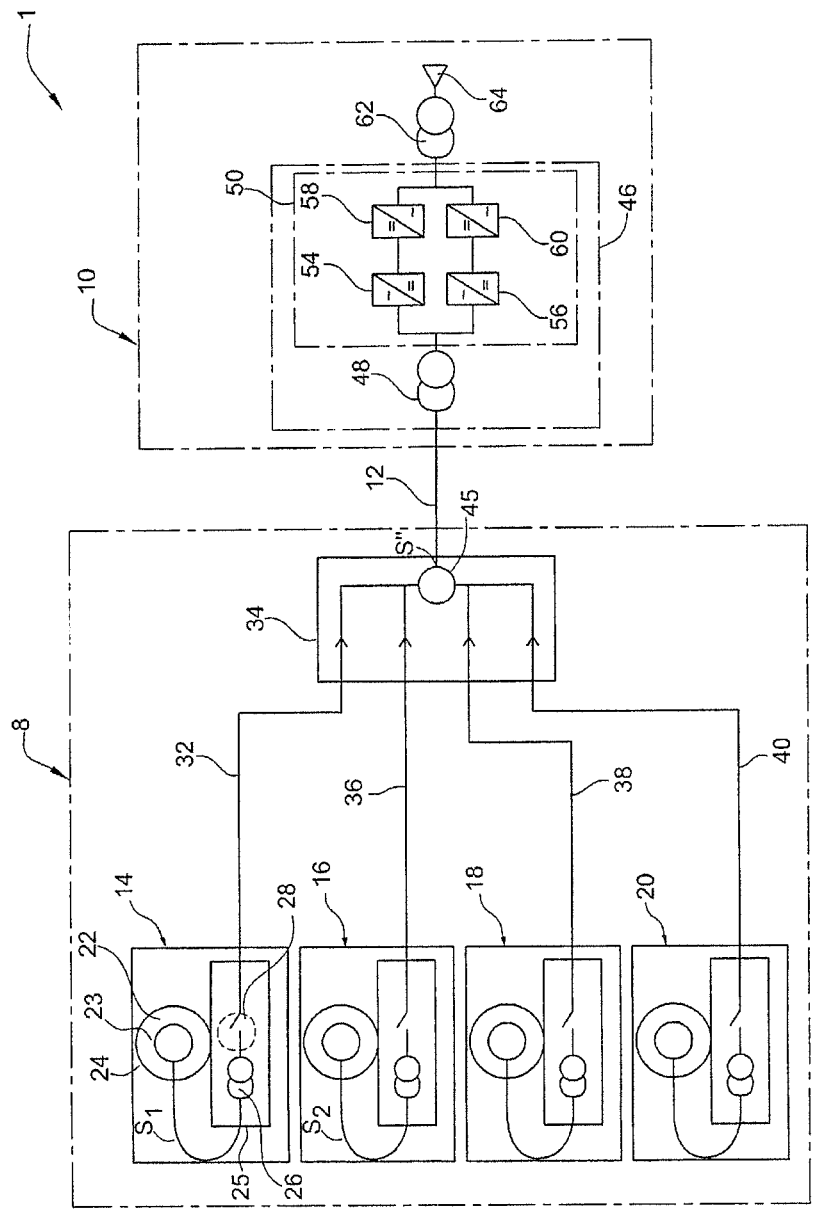

INSTALLATION FOR PRODUCING ELECTRICITY INCLUDING A PLURALITY OF ELECTRICITY PRODUCING DEVICES CAPABLE OF TRANSFORMING MECHANICAL ENERGY INTO ELECTRIC ENERGY

CROSS-REFERENCE TO RELATED APPLICATION

This application is based upon and claims the benefit of priority of the prior French Patent Application No. 1162495, filed Dec. 28, 2011, the disclosure of the prior application is hereby incorporated in its entirety by reference.

FIELD

The present invention relates to an electricity producing installation including a plurality of devices capable of transforming mechanical energy into electric energy.

The invention is located in the field of hydroelectric production, in particular by devices producing electricity which are tidal turbines, at least partly immersed in water, and which use the kinetic energy of marine currents for producing electricity, or wind turbines placed at sea.

BACKGROUND

Typically, a tidal turbine consists of a mechanical receiver or turbine, with variable speed, able to be set into rotation by hydraulic stream flow, for example a wave or a current in a stream, and of an alternator connected to the mechanical receiver, which converts the mechanical power generated by the hydraulic stream flow into electric power. An alternator typically comprises a rotor which is mechanically connected to the turbine and set into rotation by the latter and one or several stators, the rotation of the rotor creating an electromagnetic field by induction. Thus, the mechanical energy provided to the rotor is transformed into AC electric energy. The voltage and the electric frequency provided are proportional to the speed of rotation of the rotor.

The alternator provides at the output an electric AC current with variable frequency, the frequency being dependent on the speed of rotation of the turbine which depends on the flow rate of the hydraulic stream, itself variable. Now electricity distribution and transport networks operate at a set frequency, for example 50 Hz in Europe and 60 Hz in the USA.

In order to allow electricity to be provided for a transport or distribution network, the coupling of such an alternator is known with an electric energy converter, capable of converting the electric signal from the alternator into an electric signal with a set voltage and a set frequency, ready to be provided to the distribution or transport network.

Presently, connecting an energy converter with an alternator and therefore with a tidal turbine is known, in order to draw the best possible yield of the stream flow passing through each tidal turbine and to convey a maximum of electric power towards the distribution or transport network. Nevertheless, the integration of one power converter per device for producing electricity, either immersed or partly immersed, is expensive and restrictive, in particular because of the requirement of ensuring the seal and an increased reliability level of such a power converter; alternatively, the installation of an emerged power converter at each machine is not acceptable, neither by the public (visual impact), nor by the authorities (restriction to navigation and to fishing, hazard). Further, the maintenance of such an immersed or partly immersed power converter is very expensive, since it requires means for intervening at sea, in particular for lifting underwater caissons which are generally very heavy.

An alternative solution consisting of placing for each alternator, the associated power converter on the ground, may be contemplated but is particularly expensive, since this requires the use of a cable for transporting an electric AC signal at a variable frequency by for electricity producing device.

It is desirable to make the electric energy producing installations based on tidal turbines, less expensive and easier to maintain.

SUMMARY

For this purpose, the invention proposes an electricity producing installation including a plurality of electricity producing devices at least partly immersed in water, capable of transforming the mechanical energy provided by a stream flow into electric energy, each electricity producing device comprising a rotary mechanical receiver able to be set into rotation by the stream flow and an alternator comprising at least one rotor and at least one stator, a rotor of the alternator being capable of being set into rotation by the rotary mechanical receiver, characterized in that each electricity producing device produces an electric AC signal with variable voltage and frequency conveyed by an at least partly immersed electric transport cable, and in that the installation further comprises an interconnection device to which are connected at the input, in parallel, the electric transport cables stemming from each electricity producing device, and which provides at the output a joint electric signal, said joint electric signal being an electric AC signal with variable frequency and voltage, the current amplitude of which is equal to the sum of the input currents, a partly immersed export cable, connecting the output of the interconnection device to a power conversion device out of the water, said power conversion device being able to transform the joint electric signal into an electric AC signal with a set frequency intended for an electricity distribution or transport network.

Advantageously, the electricity producing devices are electrically connected in parallel, the electric energy being conveyed after interconnection via an export cable transporting an electric AC signal at a variable frequency, which gives the possibility of placing a single power conversion device for several electricity producing devices, at a distance from electricity producing devices, and on land or on a sea platform acting as an emerged therefore easily accessible electric substation. Thus, the cost of the maintenance of the power conversion device is considerably reduced.

Putting the devices for producing energy in parallel in a stable operational system, leads to speed and frequency synchronization of the alternators. The inventors have noticed by simulation a slight lowering of the yield in terms of total provided electric power as compared with the case when each electricity producing device is utilized individually.

The electricity producing installation according to the invention may also have one or more of the features below:
- each electricity producing device includes a synchronous alternator with permanent magnets;
- each electricity producing device includes an asynchronous alternator;
- each electricity producing device comprises a transformer connected to the output of the alternator and capable of increasing the voltage and of reducing the current intensity of the electric signal provided by the alternator;
- the power conversion device comprises a transformer capable of reducing the voltage and of increasing the current intensity of the electric AC signal with variable frequency provided at the input of the power conversion device;

the power conversion device includes a power conversion assembly consisting of at least one first converter capable of converting an input electric AC signal with variable frequency and with variable voltage into an output electric DC signal, and a second converter, the input of which is connected to the output of said first converter, capable of converting an input DC signal into an output AC signal with set frequency;

said power conversion assembly includes a sub-assembly or several sub-assemblies electrically connected in parallel, each sub-assembly including a so-called first converter and a so-called second converter;

said power conversion device includes means for applying a power regulation method, capable of modulating the parameters of the joint electric signal stemming from the interconnection device; and said means for applying a power regulation method are able to impose the current intensity of the joint electric signal, causing regulation of the average of the current intensity of the electric AC signal provided by each electricity producing device and frequency synchronization of said electric AC signals.

DESCRIPTION OF THE DRAWINGS

Other features and advantages of the invention will become apparent from the description which is given thereof below, as an indication and by no means as a limitation, with reference to the appended single figure (FIG. 1), which is an exemplary installation for producing energy according to the invention.

DETAILED DESCRIPTION

The invention will be described in its application for an electricity producing installation including electricity producing devices which are tidal turbines. More generally, the invention provides an advantage for any electricity producing installation including electricity producing devices which are at least partly placed in water.

In the example of the FIGURE, the electricity producing installation 1 comprises at least one partly immersed portion 8 and an emerged portion 10, both portions being connected through an electric cable capable of transporting an electric AC signal with variable frequency 12. The installation 1 consists of four electricity producing devices, 14, 16, 18, 20, or tidal turbines, which are connected in parallel, as explained in more detail hereafter.

According to an embodiment, the electricity producing devices are connected in a "daisy chain" mode, which achieves parallel electric connection while using a single cable for connecting the devices.

Alternatively, an electricity producing installation according to the invention may comprise any number N of tidal turbines.

The tidal turbines operate by means of the energy of a stream or marine currents.

Each tidal turbine, such as for example the tidal turbine 14, comprises a rotary mechanical receiver of a hydraulic stream flow or a turbine, not shown in the figure. The turbine is mechanically bound to the alternator 22, which for example is a synchronous electric machine including a rotor 23 and at least one stator 24, both elements being concentric with a stator 24 with the shape of a circular crown which surrounds the rotor 23 in the embodiment of the figure. Other known topologies for the placement of the rotor/stator(s) unit may be contemplated as an alternative.

In an embodiment, the rotor is with permanent magnets.

Alternatively, asynchronous alternators are used.

When operating, the turbine is able to set the rotor into rotation, thereby inducing an electromagnetic field in the rotor/stator(s) assembly. The alternator provides an electric AC signal.

An electric signal is defined by its parameters including the current intensity, or more simply the current, the voltage level or more simply the voltage. In the case of an AC signal such as for example a sinusoidal signal, the parameters also comprise the frequency, which is the same for the current and for the voltage, and the phase which is equal to the phase shift angle between current and voltage.

The synchronous alternator 22 with permanent magnets provides an electric AC signal S1 with variable frequency.

When the electric signal S1 generated by the alternator is in the range [110V, 3.3 kV], the electric signal S1 obtained at the output of the alternator 22 is provided to a circuit 25 including a first transformer 26 which increases the voltage of the electric signal S1 and reduces the associated current intensity, while maintaining the electric signal S1 power constant. The transformer 26 is a static transformer.

Typically, the transformer 26 performs a low voltage transformation, typically 400V-690V to a medium voltage, typically 11kV, therefore a voltage increase by a factor of about 25. The current intensity is reduced by the same factor, in order to retain constant power. For example, the current passes from 2,500 A (amperes) to 100 A.

The role of the transformer 26 in this embodiment is to reduce the current intensity in a range of values which allows easy transport by an underwater electric cable over potentially quite long distances, from the order of 1 to 15 km.

In the preferred embodiment, when an alternator is used giving the possibility of generating a high voltage electric signal, of the order of 11 kV, the device for producing electricity 14 does not comprise any transformer 26, which allows the costs of this transformer to be omitted.

Further, the circuit 25 conventionally comprises a safety switch 28 at the output of the transformer 26 when it is present, which allows insulation of the electricity producing device 14 if necessary, such as for example in the case of a failure or malfunction in order to insulate it from the remainder of the installation. When the switch 28 is activated, the current delivered by the production device 14 to the electricity producing installation is reset to zero.

At the output, the electricity producing device 14 provides a second electric signal S'1, which is the first electric signal S1 in the embodiment without a transformer 26, the voltage of which is comprised between 10% and 100% of the maximum value Vmax, for example 11 kV and the current is comprised between 10% and 100% of a maximum value Imax, for example 600 A. This electric output signal is an electric AC signal with variable frequency and with variable voltage limited to a maximum value equal to 11 kV in this embodiment.

Of course, the maximum values of 11 kV and 600 A are given here as an example, the principle of the invention remaining valid for greater maximum values.

The output of the electricity producing device 14 is connected to an electric transport cable 32 which is an underwater cable in this embodiment and which is capable of conveying the electric signal S'1 with variable voltage and frequency towards the interconnection device 34.

The other electricity producing devices 16, 18, 20, are similar to the electricity producing device 14, and comprise similar elements providing at the output electric signals S'2, S'3 and S'4 with variable frequency and with variable voltage, respectively.

Similarly, the electric signals S'2, S'3 and S'4 are conveyed through the respective electric transport cables 36, 38, 40 to the input of the interconnection device 34. The electric signals S'1, S'2, S'3 and S'4, with variable voltage and with variable frequency arrive at the input of the interconnection device 34 and are interconnected in parallel by a coupler 45. At the output of the coupler 45, a joint electric signal S", the current amplitude of which is equal to the sum of the currants of the input signals, is obtained. The frequency of the joint electric signal S" typically varies in between a range from 1 Hz to 100 Hz, and its voltage ranges up to the maximum voltage Vmax equal to 11 kV in this embodiment.

The joint electric signal S" is then conveyed over the electric export cable 12, which is capable of conveying an electric signal with variable frequency and with variable voltage to the emerged part 10 of the electricity producing installation 1.

The export cable 12 connects the interconnection device 34 to a power conversion device 46 located out of the water, which facilitates its maintenance.

Advantageously, a single electric export cable and a single power conversion device out of the water are required, regardless of the number of electricity producing devices connected in parallel.

The power conversion device 46 includes a second transformer 48 which has the role of decreasing the voltage of the joint electric signal S" in order to make it compatible with the assembly of power converters 50 connected to the output of the transformer 48.

Typically, the transformer 48 gives the possibility of passing from an electric input signal with a maximum voltage of 11 kV to an electric output signal with a maximum voltage equal to the maximum voltage level of the converter, for example 690 V, 900V, 1200 V, 2.2 kV, 3.3 kV, 4 kV or 6.6 kV, while retaining the power of the electric input signal.

In the embodiment illustrated in the figure, an assembly of power converters connected in parallel on two branches is used.

Alternatively, a single converter or a number of converters of more than two is used. The number of converters to be used varying depending on the characteristics of the converters used and on the number of electricity producing devices connected in parallel.

In more detail, the assembly of power converters 50 consist of two sub-assemblies connected in parallel, each sub-assembly including a first converter 54 (56, respectively) which converts an electric AC signal into an electric DC signal. A second converter 58 (60, respectively), the input of which is connected to the output of the first converter 54, which converts the electric DC signal from the first converter into an electric AC signal with a set frequency and a set voltage capable of being distributed over an electricity distribution and transport network. In practice, the converters 54, 56 are four quadrant active rectifiers and the converters 58, 60 are of the same nature.

The number of sub-assemblies of converters to be connected in parallel is dependent on the power of the joint electric signal S" from the export cable 12, the operating ranges of the power converters being set by design. Typically, for a power of the order of 4MW from the parallel connection of four devices for producing electricity, two sub-assemblies of converters are connected in parallel, with 2MVA/690V converters. More generally, the number of sub-assemblies of converters with a set operating range of the converters, is dependent on the number N of electricity producing devices branched in parallel, given that the total provided power is equal to the sum of the powers provided by each of the electricity producing devices.

The output of the assembly of converters is connected to the input of a third transformer 62 which transforms an electric AC signal of 690V into an electric AC signal with the voltage of the distribution or transport network, typically 20 kV, and with a frequency equal to the frequency of the electricity distribution/transport network, therefore equal to 50 Hz in Europe.

The electric signal obtained at the output of the transformer 62, is provided to the distribution/transport network via the connection 64.

In the electricity producing installation 1 described, stable operation imposes synchronization of the speed and of the rotation frequency of the rotors of the alternators connected in parallel. The power conversion assembly 50 regulates the parameters of the electric signal on its terminals, and consequently the power conversion assembly 50 acts as a driving member which imposes the parameters of the joint electric signal S", and notably its current intensity. Now, the joint electric signal S" stems from the summation of the electric signals S'1 to S'4 provided by each of the alternators.

The regulation of the current intensity of the joint electric signal S" therefore leads to regulation of the electric current intensity of the signals delivered by the alternators of the electricity producing devices 14, 16, 18, 20. Therefore, for each alternator, an electromagnetic braking torque associated with the current intensity which is applied to the rotor of the alternator, is adjusted so as to impose synchronization of the rotors. The speed of rotation of the turbine which drives each rotor is identical and proportional to the electric frequency for all the electricity producing devices connected in parallel and equipped with synchronous alternators. The speed of rotation is very close [a deviation of less than 5%] for turbines connected in parallel and equipped with asynchronous alternators.

In a known way, in the case of an alternator driven by a turbine and connected to a power converter, the converter regulates the power, so as to adjust the electric current intensity delivered by the alternator with which an electromagnetic braking torque may be obtained, which allows optimization of the speed of rotation of the turbine and with which therefore a maximum yield may be obtained, i.e., a maximum of electric energy, measured as a power, relatively to the available mechanical energy.

In the installation according to the invention, several electricity producing devices are connected in parallel. A power regulation method is applied, allowing the power conversion assembly 50 to be driven in order to deliver a joint electric signal S" with maximum power. For example, the regulation method described in patent application FR11.55559 is used. Such a method is typically applied by a control unit not shown capable of controlling the power conversion assembly 50.

The regulation of the current intensity of the joint electric signal S" is distributed over the currents provided by the alternators of the electricity producing devices connected in parallel, so as to regulate the average of the current intensity provided by each alternator.

Alternatively, other known methods may be used for driving a power converter connected to a single alternator and allowing operation of a single alternator at its optimum operating point so as to obtain power regulation of the average power of the alternators connected in parallel, by considering that the alternators connected in parallel have an operation similar to a single <<average>> alternator, the electric characteristics of which are again found by averaging the characteristics of each connected alternator. The methods may for example be methods based on a digital observer.

It should be noted that unlike a conventional installation in which each electricity producing device has its own power converter, in which each electricity producing device operates with optimum yield depending on the stream flows providing the mechanical energy, in the installation according to the invention, the yield of each electricity producing device is optimized on average.

Consequently, a slight loss occurs in terms of yield as compared with an operation without connecting the electricity producing devices in parallel. Nevertheless, the inventors have noticed with simulations that the yield loss is low.

It also appears that even with quite significant variations in terms of flow rate of the local hydraulic flow, the overall electric power loss obtained is low.

Also, it was noticed that for small differences on the characteristics of alternators connected in parallel, the loss in terms of total produced electric power is also low.

Advantageously, an electricity producing installation as proposed allows reduction in the installation and maintenance costs, while retaining a stable system and with low loss in terms of the total generated electric power as compared with a conventional system much more expensive as regards installation and maintenance.

The invention claimed is:

1. An electricity producing installation including a plurality of electricity producing devices at least partly immersed in water, capable of transforming mechanical energy provided by a stream flow into electric energy, each electricity producing device comprising a rotary mechanical receiver able to set into rotation by the flow stream and an alternator comprising at least one rotor and at least one stator, the at least one rotor of the alternator being able to be set into rotation by the rotary mechanical receiver, wherein each electricity producing device produces an electric AC signal with variable voltage and frequency conveyed by an at least partly immersed electric transport cable, the installation further comprising:

an interconnection device to which are connected at an input, in parallel, the electric transport cables stemming from each electricity producing device, and which provides at an output a joint electric signal, said joint electric signal being an electric AC signal with variable frequency and voltage, the current amplitude of which is equal to the sum of input currents; and a partly immersed export cable connecting the output of the interconnection device to a power conversion device out of the water, said power conversion device being capable of transforming the joint electric signal into an alternating electric signal with a set frequency intended for an electricity distribution or transport network.

2. The electricity producing installation according to claim 1, wherein for each electricity producing device the alternator is a synchronous alternator with permanent magnets.

3. The electricity producing installation according to claim 1, wherein for each electricity producing device the alternator is an asynchronous alternator.

4. The electricity producing installation according to claim 1, wherein each electricity producing device comprises a transformer connected to an output of the alternator and capable of increasing a voltage output by the alternator and of reducing a current intensity of the electric signal provided by the alternator.

5. The electricity producing installation according to claim 1, wherein the power conversion device comprises a transformer capable of reducing the voltage of the electric AC signal and of increasing the current intensity of the electric AC signal with variable frequency provided at an input of the power conversion device.

6. The electricity producing installation according to claim 1, wherein the power conversion device includes a power conversion assembly consisting of at least one first converter capable of converting an input electric AC signal with variable frequency and variable voltage into an output electric DC signal, and a second converter an input of which is connected to receive the output electric DC signal of said first converter, capable of converting an input DC signal into an output AC signal with set frequency.

7. The electricity producing installation according to claim 6, wherein said power conversion set includes a sub-assembly or several sub-assemblies electrically connected in parallel, each sub-assembly including a first converter and a second converter.

8. The electricity producing installation according to claim 1, wherein said power conversion device includes means for applying a power regulation method capable of modulating parameters of the joint electric signal stemming from said interconnection device.

9. The electricity producing installation according to claim 8, wherein said means for applying a power regulation method are capable of imposing the current intensity of the joint electric signal leading to regulation of an average of the current intensity of the electric AC signal provided by each electricity producing device and to frequency synchronization of said alternating electric signals.

* * * * *